Dec. 31, 1968     M. F. GIRGIS     3,419,056

METHOD FOR PEELING AND PROCESSING GRAIN

Filed May 13, 1966     Sheet 1 of 3

INVENTOR.
MAGDY F. GIRGIS
BY Elliott & Pastoriza
ATTORNEYS

INVENTOR.
MAGDY F. GIRGIS
BY
Elliott & Pastoriza
ATTORNEYS

Dec. 31, 1968 M. F. GIRGIS 3,419,056
METHOD FOR PEELING AND PROCESSING GRAIN
Filed May 13, 1966 Sheet 3 of 3

INVENTOR.
MAGDY F. GIRGIS
BY
*Elliott & Pastoriza*
ATTORNEYS

United States Patent Office 3,419,056
Patented Dec. 31, 1968

3,419,056
METHOD FOR PEELING AND
PROCESSING GRAIN
Magdy F. Girgis, 3121 Killarney Lane,
Costa Mesa, Calif. 92626
Filed May 13, 1966, Ser. No. 549,938
4 Claims. (Cl. 146—221.6)

ABSTRACT OF THE DISCLOSURE

A method of peeling the hulls from sesame seeds is described and includes the steps of soaking the sesame grain in pure water a sufficient length of time to saturate the seeds and inflate the seeds thereby softening the hull; rubbing the grain between opposed surfaces to peel off the hulls; depositing the hulls and seeds in a brine solution of density greater than that of pure water such that the hulls fall to the bottom and the seeds float to the top of the solution; and removing the seeds from the solution. The method also contemplates further steps of drying the seeds at graded temperatures between one hundred and one hundred and fifty degrees centigrade.

---

This invention relates broadly to the treating of grain and more particularly to an improved method and apparatus for peeling and processing grain.

Typical of the type of grain to which the present method and apparatus are most applicable are sesame seeds. For purposes of illustrating preferred embodiments of the method and the apparatus, the present invention will be described in conjunction with the peeling and processing of sesame seeds. It is to be understood however that the method and apparatus may well be used for peeling or hulling and otherwise processing other types of grain.

Sesame grain includes seeds surrounded by relatively hard hulls. As in the case of many other grains, the major problem is to separate the hulls from the seeds or in some other manner "peel" the hulls from the seeds without damaging the seeds so that the seeds themselves will be of use. Sesame in its purchased raw state usually contains from 3 to 15% of foreign matter in the form of mud, leaves, stems and other products. In addition, the sesame may include defective seeds and "black spots." Such "black spots" constitute small foreign particles from the flower of the sesame plant. In any method and apparatus employed for hulling or peeling the seeds, it is important to include suitable steps and apparatus to remove foreign matter, any defective seeds, and any "black spots." Many of these processes may be combined advantageously with the steps involved for peeling the hulls from the seeds themselves.

From the standpoint of marketing, it is important that the finally treated sesame seeds be as pure and as undamaged as possible after being hulled. In this respect, they must be substantially free of moisture, clean, and preferably polished. With pure, clean and polished seeds, it is a simple matter thereafter to grade the seeds by suitable screens according to size. The seeds are also in proper condition for roasting and in some instances, an additional step in the treatment of the seeds would be to roast the same after hulling, cleaning, and polishing. However, normally the sesame seeds will be provided in unroasted condition.

With the foregoing considerations in mind, it is a primary object of the present invention to provide a vastly improved method and apparatus for hulling or peeling grain wherein a minimum of damage occurs to the seed and wherein the hulls may be completely separated from the seeds.

Another important object is to provide a method and apparatus for treating grain, preferably sesame, wherein the hulls are completely separated from the seed without damage to the seed, and in addition, defective seeds and "black spots" are also separated from normal seeds.

Still another important object is to provide a method and apparatus for peeling and processing sesame grains in which the resulting seeds are cleaned and highly polished.

Another important object is to provide improved apparatus for peeling and treating sesame seed which is substantially completely automatic in operation to the end that large quantities of grain may be treated in a given time.

Briefly, the method of the invention contemplates the basic steps of soaking a quantity of the sesame to inflate the seed and soften its hull; rubbing the grain between opposed surfaces to peel off the hulls; tumbling and washing the hulls and seeds; depositing the hulls and seeds in a solution of density such that the hulls fall to the bottom and the seeds float to the top of the solution; and removing the seeds from the solution. After the seeds have been removed from the solution, they are washed, demoisturized and dried and polished by a series of heating operations wherein the temperature ranges from 100 to 150° C.

A preferred apparatus for carrying out the method comprises a hulling machine so designed as to provide opposing smooth surfaces in spaced relationship for rubbing the seeds; a tumbling and washing apparatus which will serve to separate the hulls from the seeds after the hulling machine has completed its operation; and a novel drying and polishing oven which serves to remove any moisture to a tolerable percent and also polish the seeds.

A better understanding of the method and preferred apparatus for carrying out the method of this invention will be had by now referring to the accompanying drawings, in which.

Figure 1:
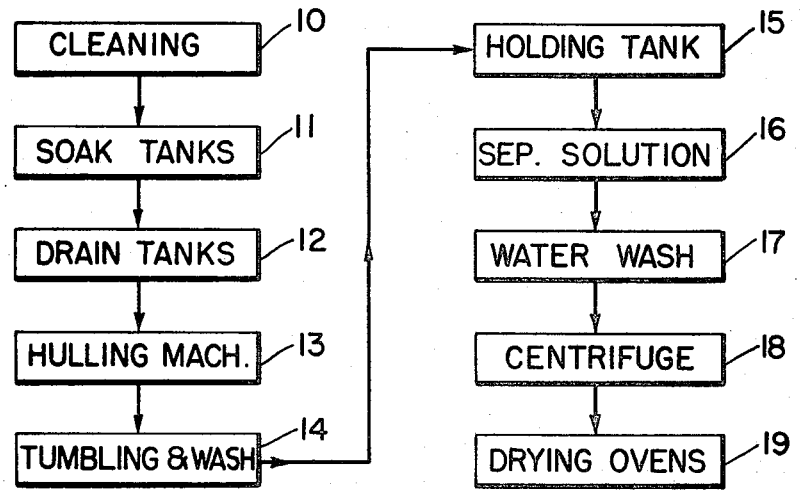
FIGURE 1 is a schematic block diagram illustrating various steps in the preferred form of the method of peeling and processing sesame grains.

Referring first to FIGURE 1 there is illustrated the various basic steps in processing sesame seed in accordance with the method of the invention. As indicated at 10, the raw sesame is initially cleaned. As mentioned, the sesame may contain from 3 to 15% of foreign matter in the form of mud, leaves, stems and the like. To affect an initial cleaning, the sesame may be passed through a vibrating type of structure cooperating with a suitable airblower or similar cyclone type device which will separate the light matter such as dust, leaves and the like from the grain. The initial cleaning by vibration and blowing is not essential if the sesame grain is provided in a relatively clean condition to start.

In accord with the next step of the method, the sesame grains are soaked in soft water at room temperature. This is carried out in soak tanks as indicated at 11. Preferably, this soaking continues for approximately eight to twelve hours. The result of the soaking is that the grain absorbs the water and the seeds expand and become bloated. The hulls in turn are softened. The absorption of water may be up to 40% by weight.

After the soaking operation, the water is drained and the seeds are permitted to remain in a wet condition for approximately eight hours. The drain tanks indicated at 12 preferably should be at least partially emptied from the surface so that any floating debris from the soaked grain may be skimmed from the top of the water. The last portion of the water in the drain tanks may be drained from the bottom to leave the seeds in the desired wet condition.

The bloated seed, after having remained in a wet condition for the approximate eight hour period is now ready for hulling or peeling. Essentially, this step in the method as shown at 13 constitutes a rubbing of the seeds between opposed, smooth surfaces while they are in their bloated condition and preferably in the presence of an abrasive such as sand. The rubbing action functions to peel or separate the hulls from the seeds. However, the resulting material still constitutes a mixture of the hulls and seeds and it is therefore necessary to effect further operations to actually physically separate the hulls from the seeds.

In accord with the next step of the method, the mixture of the hulls and seeds is passed to a tumbling and washing apparatus 14 which serves to aid in completely separating the hulls from the seeds and also functions to remove any further mud or dust which may have been worked loose by the hulling or peeling action. In this respect, some of the hulls may still be stuck to the seeds although peeled therefrom and the tumbling and washing step of the method serves to effect or complete the separation of the hulls from the seeds.

The next step of the method is to pass the mixture of hulls and seeds to a holding tank designated 15 in FIGURE 1. The holding tank simply constitutes a reservoir of water to receive hulls and seeds from the tumbling and washing structure and permit transition from a continuous operation to a batch operation carried out in the subsequent steps.

After a suitable quantity of the hulls and seeds have been collected in the holding tank, the hulls and seeds are passed into a separating solution 16. This separator comprises a separating solution such as brine of density between sixteen and twenty degrees Baumé. Separation of the hulls from the seeds results from the difference in density between the hulls and the seeds. The density of the seeds is less than that of the hulls so that in the brine solution, the seeds will tend to float to the top of the solution and the hulls will drop to the bottom. This particular step may be repeated a number of times by passing the brine solution seeds from the top surface or upper region of the brine solution to a further solution and so forth until a complete separation of the hulls and seeds has been realized.

The separated seeds from the top surface of the brine solution are then passed into a fresh water solution. This fresh solution will effect a washing of the salt water from the seeds as indicated by the block 17 in FIGURE 1 and also serves the additional desirable function of separating "black spots" and defective seeds from the desired product. In fresh water, the density of the desired seeds is such that they will drop to the bottom whereas defective seeds and "black spots," will float to the surface of the fresh water. These defective seeds and "black spots" may then be scooped off or otherwise removed.

After the foregoing steps have been completed, the seeds still contain by weight from 35 to 40% water. This excess moisture is removed in accordance with the next step of the method by simply centrifuging the seeds in a perforated basket centrifuge. This step is illustrated at 18 in FIGURE 1.

Even after centrifuging, however, there is still a moderate quantity of water in the seeds and if the seeds are left in this condition they will mold and spoil. It is therefore necessary to provide a final step in the method for removing substantially all of the moisture in the seeds so that no more than 3 to 4% of water by weight remains in the seed.

This last step is effected in drying and polishing ovens indicated at 19 in FIGURE 1. Essentially, the seeds are placed in special ovens which have carefully controlled temperatures varying from 100 up to 150° C. It is preferable to dry the seeds in stages and towards this end there may be provided a series of ovens, the seeds being agitated while in the oven and subjected to a given first temperature such as 100° C., then removed to a second oven where the temperature may be 120° C., and then removed to a third oven and so forth.

During the drying operation, the seeds, as mentioned, are agitated or moved back and forth over a smooth heated surface and this action not only aids in assuring a uniform drying of the seeds but also provides a high polish to the seeds. The reason for providing a series of ovens is that during the drying process, a muddy oil film tends to collect on the oven surface which tends to dirty the seed. Thus, to expeditiously process the seeds, it is preferable to remove the seeds from one oven and place them in another oven after the first oven becomes sufficiently dirty as to require cleaning, rather than stop the operation to clean an oven before again subjecting the seeds to heat.

The heating operation is carried on until the desired amount of moisture is removed. The mixing and agitation which takes place during the drying process imparts a desired high polish to the seeds.

With reference now to the remaining FIGURES 2 through 9 of the drawings, preferred forms of apparatus for carrying out certain of the steps described in FIGURE 1 are illustrated.

Figures 2, 3:
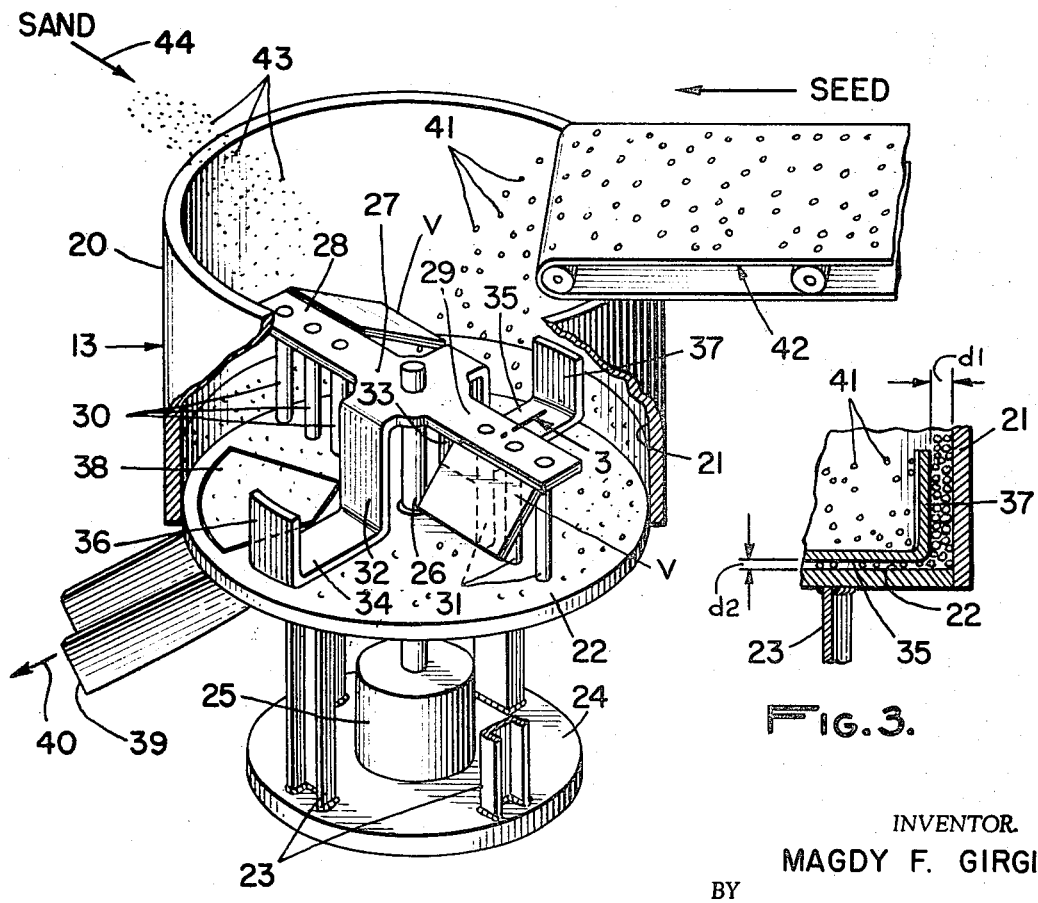
FIGURE 2 is a cutaway schematic perspective view of a hulling machine for carrying out one of the method steps described in FIGURE 1.
FIGURE 3 is a fragmentary cross-section taken in the direction of the arrow 3 in FIGURE 2.

Referring first to FIGURE 2, the hulling machine for carrying out the hulling or peeling step 13 of FIGURE 1, comprises a semi-cylindrically shaped receptacle 20 having a smooth interior cylindrical wall 21 and a flat smooth floor surface 22. The floor and wall structure is supported by suitable legs 23 on a stationary platform 24.

A motor drive 25 includes an upwardly extending shaft 26 terminating in a rotary structure including a hub 27 within the cylindrical interior of the receptacle 20. As shown, the hub 27 includes radially oppositely extending arms 28 and 29 from which a plurality of legs 30 and 31 respectively extend. These legs terminate short of the flat floor surface 22 and are generally disposed in parallel relation to each other. The hub structure 27 also includes radially extending arms disposed at right angles, respectively, to the radial arms 28 and 29. These arms are defined by initial downward portions such as indicated at 32 and 33 and flat radially extending portions 34 and 35 having smooth undersurfaces in opposed given spaced relationship to the floor 22. These undersurfaces terminate in upwardly extending sections 36 and 37, respectively, the outer surfaces of which are preferably convex in shape and spaced at given distances inwardly from the interior cylindrical wall 21.

The spacing between the sections 36 and 37 and the wall 21 is designated $d_1$ in FIGURE 3 and this spacing may correspond to the spacing $d_2$ of the under surfaces of the arms from the floor 22, but is preferably larger for better mixing of the seeds. These distances $d_1$ and $d_2$ may be of the order of 1½" and ½" respectively.

The floor 22 includes a door or hatch 38 cooperating with a chute 39 to enable removal of the grain as indicated by the arrow 40 from the receptacle 20 after the hulling operation has been completed.

In FIGURE 2, the grain 41 is shown being conveyed to the receptacle 20 by a suitable conveyor structure 42. Preferably, there is also added an abrasive material such as sand 43 as indicated by the arrow 44.

In the operation of the hulling machine, and with reference to both FIGURES 2 and 3, the motor 25 is energized to rotate the shaft 26 and thus rotate the rotary structure 27 and the radially extending arms in a counter-clockwise direction as viewed from above. The walls of the receptacle are held stationary so that there is relative motion between the undersurfaces 34 and 35 and the flat floor surface 22 and the upwardly extending convex surfaces 36 and 37 of these arms and the interior cylindrical wall.

With the hub structure 27 rotating, and grain passed into the receptacle together with the abrasive in the form of the sand 43, the downwardly depending legs 30 and 31 will serve to mix the sand and grain and agitate the same as the structure rotates. The various particles of grain will become entrapped between the opposed surfaces defined by the flat surfaces 34 and 35 and the flat floor surface and the raised sections 36 and 37 and the interior cylindrical wall. This action can best be seen with reference to FIGURE 3 wherein the spacing $d1$ and $d2$ between these surfaces is such as to confine portions of the grain so that the grain is rubbed against the surfaces and against each other as the arms rotate and the hulls are thereby peeled from the bloated seed. This action is aided by the sand particles.

After the grain has been hulled as described, the door 38 may be dropped open to provide communication between the interior of the receptacle 20 and the chute 39. The rotary structure 27 is then caused to rotate in a reverse or clockwise direction. This action causes a pair of vane members hinged along their upper edges to the radially extending arms 28 and 29 to collapse downwardly against the depending legs 30 and 31 respectively. These vanes thus provide impelling surfaces to urge the grain through the door 38 and thus empty the receptacle 20 of the seeds and hulls.

The hulling machine is then ready to receive a new batch of grain and after the door is closed, the grain is received in the receptacle and the rotary structure caused to rotate again in a counter-clockwise direction when viewed from above. As the legs pass through the grain to agitate the same, the vanes will simply be free to swing outwardly and ride over the grain as indicated in FIGURE 2.

Figure 4:
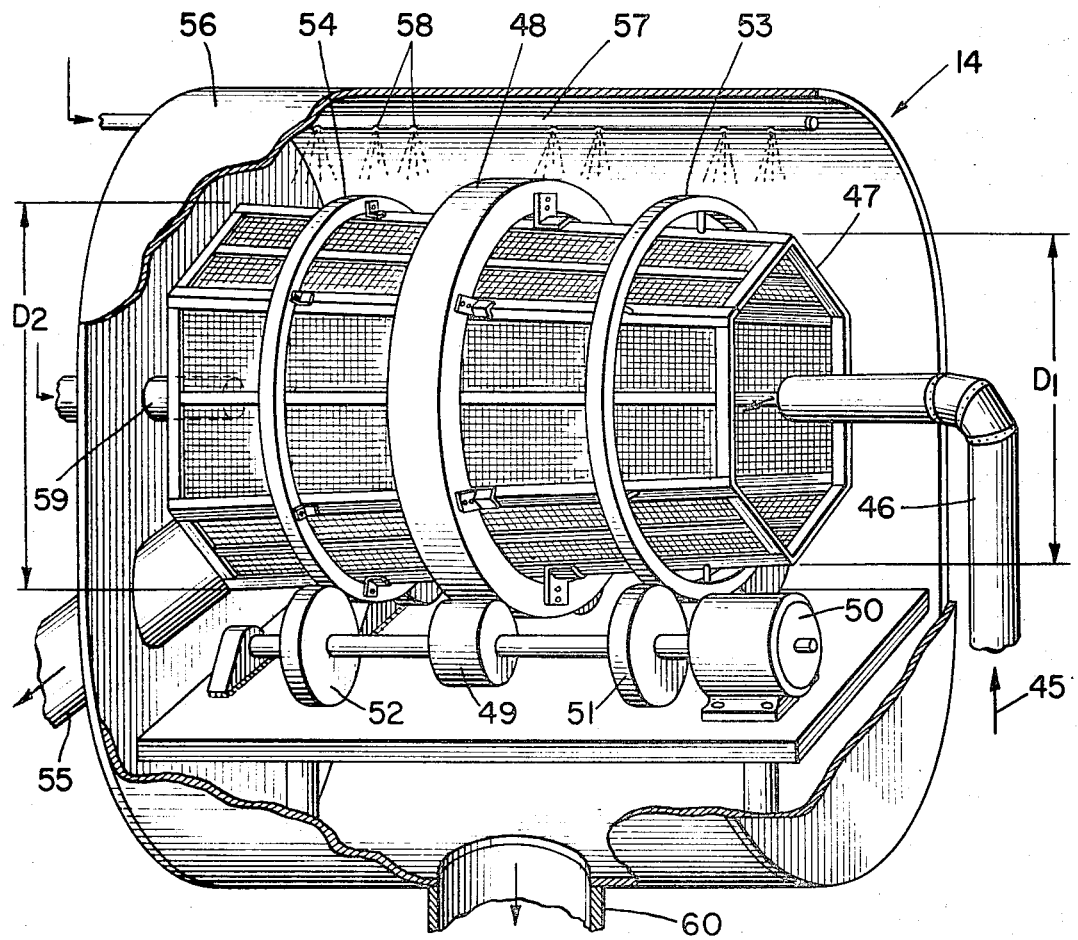
FIGURE 4 is a cutaway perspective view of a tumbling and washing apparatus useful in carrying out another step in the method of FIGURE 1.

Referring now to FIGURE 4, there is shown a preferred form of apparatus to carry out the tumbling and washing step in the method. As indicated by the arrow 45 in the right hand portion of FIGURE 4, the hulls and seeds from the hulling machine described in FIGURES 2 and 3 are passed up through a conduit 46 into the entrance end of a screened tunnel structure 47. Preferably this tunnel structure is in the form of a six sided screened enclosure having open entrance and exit ends. It will be evident in FIGURE 4 that the entrance end is slightly smaller in cross-sectional area than the exit end. By this geometrical configuration, the seeds will be caused to travel from right to left towards the exit end upon rotation of the screened tunnel structure.

Rotation of the structure is carried out by a main driving ring structure 48 surrounding the central portion of the screened tunnel and driven through suitable rollers such as indicated at 49 coupled to a motor 50. Auxiliary rollers 51 and 52 may be provided to engage rings 53 and 54 secured at spaced longitudinal peripheral points to the screened tunnel structure 47 to provide stability. Similar rollers are provided on the far side of the screened tunnel structure. A suitable exit chute indicated at 55 is disposed adjacent to the lower portion of the exit end of the screened tunnel structure for receiving grain migrating from this end.

The rotation of the screened tunnel structure 47 by the motor 50 results in a tumbling action on the hulls and seeds which will serve to further separate the hulls from the seeds by simple impact with the sides of the structure and with each other. During this tumbling process, water spray is injected into the screened enclosure. Towards this end the entire screened tunnel structure is enclosed in an outer casing 56. Water is passed into the enclosure 56 through a manifold 57 having nozzles 58 spaced along the manifold. These nozzles direct water downwardly through the screened structure. In addition a jet of water is longitudinally introduced into the exit end by a nozzle 59. The hulls and seeds migrating through the rotating screen structure 47 are thus subjected to water spray throughout their trip. The water itself is collected in the lower end of the surrounding casing 56 and drained through a suitable lower drain opening 60.

Figure 5:
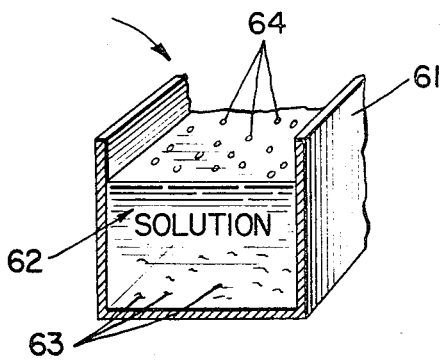
FIGURE 5 illustrates a brine solution for treating the grain in accordance with a step in the method.

Referring now to FIGURE 5, after the hulls and seeds have passed through the chute 55 they are collected in a suitable holding tank and after a given batch has accumulated, it is transferred to a tank 61 containing a solution of a given density such as brine solution 62 of from sixteen to twenty degrees Baumé. The density of the solution is such that the hulls will fall to the bottom of the tank as indicated at 63 and the seeds themselves will float to the top as indicated at 64. These seeds are then removed.

It should be understood, that a continuous treatment in the solution of given density could be carried out in such a manner that the holding tank may be eliminated.

Figure 6:
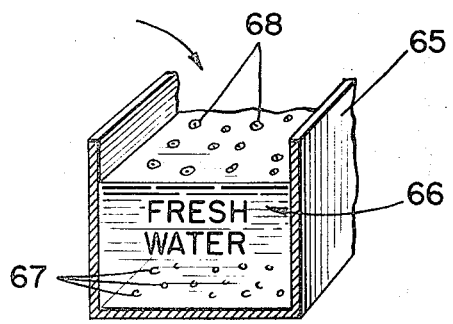
FIGURE 6 illustrates a fresh water solution for further treatment of the sesame seed in accordance with further steps in the method.

The seeds 64 are then passed to a tank 65 containing fresh water 66 as illustrated in FIGURE 6. The density of the fresh water is such that the seeds will fall to the bottom as indicated at 67 and any defective seeds and any "black spots" will float to the top as indicated at 68. These defective seeds and any "black spots" may then be skimmed from the top surface.

The final steps of the method relating to the de-moisturizing and drying of the seeds are now carried out. The centrifuging step may be carried out in any conventional type of centrifuging basket which will remove a large portion of the moisture. However, to completely dry the seeds so that no more than 3% moisture content remains there is required the drying and polishing ovens.

Figure 7:
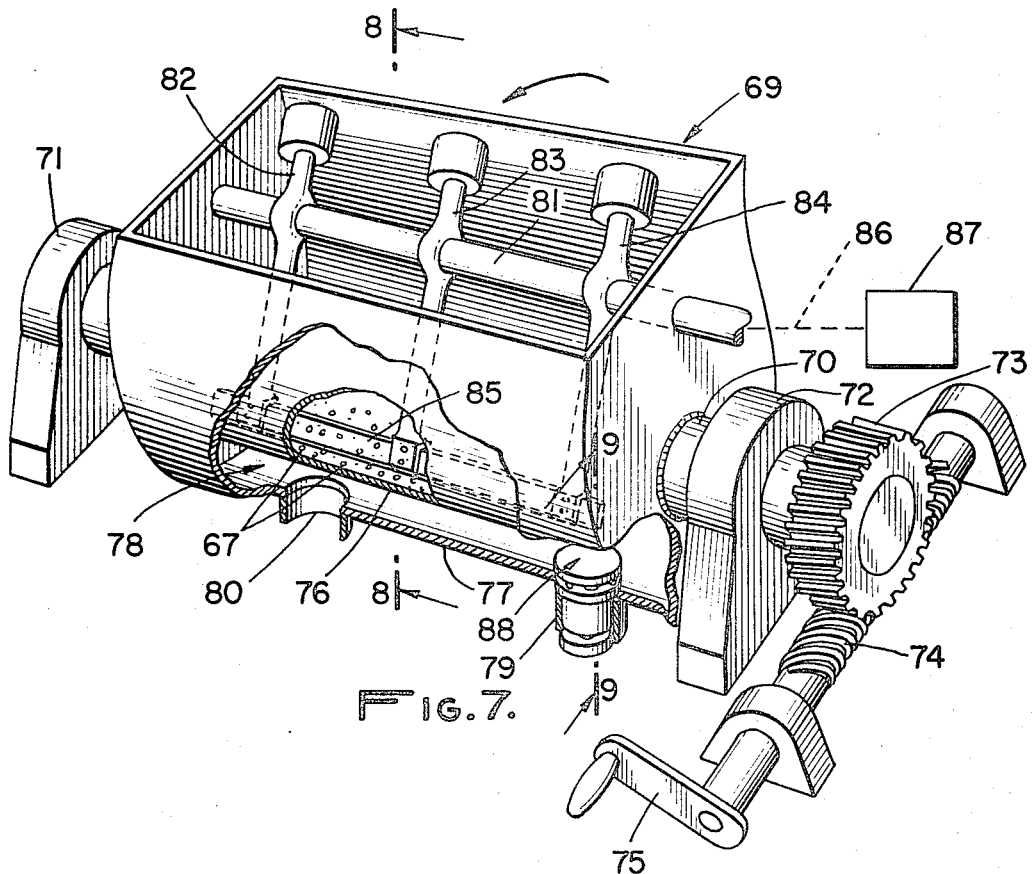
FIGURE 7 is a broken away perspective view of one of any number of drying and polishing ovens for carrying out further steps in the method.

FIGURE 7 shows a preferred type of drying and polishing oven structure for carrying out this last step of the method. With reference to FIGURE 7, the structure includes a semi-cylindrically shaped oven 69 mounted on a shaft 70 for tilting movement. Towards this end there are provided end bearings 71 and 72 for the shaft 70 together with a spur gear 73 and worm gear 74 rotatable by a suitable handle 75. With this arrangement, the semi-cylindrically shaped oven 69 may readily be tilted to empty seeds deposited therein.

The interior semi-cylindrical wall surface of the oven is indicated at 76 and to provide a suitable heating of this interior surface to dry seeds deposited in the oven there is included a double jacketed structure in the form of an additional enclosing exterior wall 77 defining with the interior wall 76 a closed chamber 78. This chamber 78 serves to receive steam passed in through an input conduit 79 and passed from an exit opening 80. The hot steam may be carefully controlled as to temperature so that the temperature of the interior wall 76 of the cylindrically shaped oven will be carefully controlled.

Figure 8:
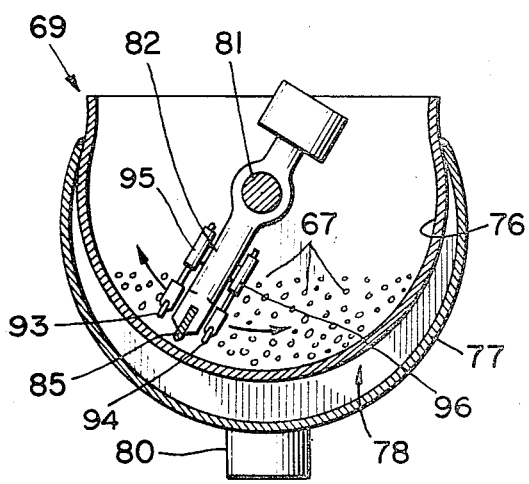
FIGURE 8 is a cross-section taken in the direction of the arrows 8—8 of FIG. 7.

It is desirable while heating the seeds to agitate or move the seeds and towards this end there is provided a mixing and polishing structure. This structure includes a shaft 81 which is coaxial with the axis of the semi-cylindrically shaped oven and includes radially extending arm structures 82, 83 and 84 terminating in an elongated blade 85. As best seen in FIGURE 8, the lower edge of the blade 85 is positioned in spaced relationship to the interior cylindrical surface of the oven. The shaft 81 is arranged to be oscillated as indicated by the mechanical connection 86 in FIGURE 7 by a suitable drive 87. Since the axis of the shaft 81 corresponds to the axis of the semi-cylindrically shaped oven, the blade 85 will remain at a fixed distance from the interior cylindrical surface of the interior wall 76.

Preferably, the inlet conduit 79 for the steam includes a baffle structure 88 so that the steam will be uniformly distributed within the jacketed interior chamber 78 and assure a uniform heating of the interior wall 76.

Figure 9:
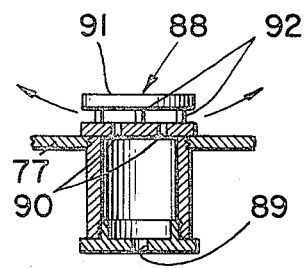
FIGURE 9 is a fragmentary cross-section taken in the direction of the arrows 9—9 of FIGURE 7.

With particular reference to FIGURE 9, it will be noted that this baffle structure includes an entrance port 89 for receiving the steam and an upper plate having suitable openings 90 for passing the steam into the interior of the oven. A top baffle plate 91 is held in spaced relationship to the openings 90 as by suitable struts 92. The top plate 91 simply deflects the steam in radial directions so as to avoid any hot spots being generated in the interior wall 76 when the hot steam is passed into the entrance 79.

In the operation of the oven of FIGURES 7, 8 and 9, steam at a controlled temperature of 100° C. is passed into the double jacketed wall structure to heat the interior wall 76. The seeds 67 are then passed into the upper open end of the semi-cylindrical oven and the shaft 81 is caused to oscillate. The seeds in the oven are thus slowly mixed and agitated and also are polished as a consequence of the rubbing of the seeds against the smooth interior cylindrical wall of the oven. They are also subjected to the heat of the oven and this will drive moisture from the seeds.

During this process, a gummy oil tends to coat the inner-cylindrical surface of the oven and after a short period of time, it is preferable to remove the seeds from the oven and pass them to another oven of identical construction to that of FIGURE 7. This removal is easily effected by simply tilting the entire semi-cylindrical structure by the gear mechanism 73, 74 and the handle 75 as described.

When the seeds are passed to the next oven, the temperature of this later oven is preferably at approximately 120° C. to provide a greater heating of the seeds and thus a greater efficiency in driving moisture from the seeds. During this later process, the first oven shown in FIGURE 7 may be cleaned and the seeds may then be re-transferred to the first oven when the second oven becomes gummy with oil. The second oven may be cleaned and the seeds then re-transferred again. Alternatively, there may be provided a plurality of ovens and the seeds simply passed in series from one oven to the next, the heating of each of the ovens being gradually increased but in no event exceeding 150° C.

With reference once again to FIGURE 8, it is possible to provide simple cleaning structures as a part of the radially extending arm and blade structure. By this arrangement, cleaning of the oven may be facilitated. Thus, as specifically shown in FIGURE 8 there may be provided small felt blades 93 and 94 running generally parallel to the main blade 85 but retracted on either side of this main blade so as to avoid contact with the interior wall 76. However, these felt blades 93 and 94 are arranged to be moved radially towards the interior wall 76 by suitable solenoids such as indicated at 95 and 96. After the seeds 67 have been dumped from the oven, the solenoids 95 and 96 may be energized to move the felt blades 93 and 94 into engagement with the smooth interior cylindrical surface 76 and oscillation of the shaft 81 will then cause a sweeping and wiping of the interior surface by the felt blades until the same is cleaned.

From the foregoing description, it will be evident that the present invention has provided a greatly improved method as well as improved apparatus for peeling and processing grain. While the particular description set forth is best suited to the peeling and processing of sesame seed. It is to be understood that the basic steps of the method and the apparatus set forth may well be employed with similar types of grain.

The invention accordingly is not to be thought of as limited to the specific combination of steps or to the specific structural arrangements of the apparatus described merely for purposes of setting forth illustrative embodiments.

What is claimed is:

1. A method of peeling the hulls from sesame seeds, including the steps of: soaking a quantity of sesame grain in water a sufficient length of time to assure that the seed is substantially saturated with water to inflate the seed and soften its hull; rubbing the grain between opposed surfaces to peel off the hulls; depositing the hulls and seeds in a solution of density falling within a given range of degrees on the Baumé density scale defining a specific gravity greater than 1.0 such that the hulls fall to the bottom and the seeds float to the top of said solution; removing the seeds from said solution; and washing and drying said seeds after removing the same from said solution in temperature steps falling between 100 and 150° C.

2. A method of peeling the hulls from sesame seeds, comprising the steps of: soaking the sesame grain in soft water at room temperature for approximately eight hours; draining the grain and permitting it to rest in a wet condition for approximately an additional eight hours; mixing the grain with abrasive particles; rubbing the grain and abrasive particles against each other and between opposed surfaces to peel off the hulls; tumbling the hulls and seeds while subjecting the same to water spray to aid in effecting complete separation of the hulls and seeds; depositing the hulls and seeds in a solution and stirring the solution; letting the hulls and seeds rest in the solution for approximately ten minutes after stirring, the density of said solution being adjusted so that said seeds float to the top and the hulls fall to the bottom; removing the seeds from said solution and centrifuging the seeds to remove surface moisture; and agitating said seeds at a temperature of from 100 to 150° C. to dry and polish the seeds.

3. The method of claim 2, including the steps of: washing said grain prior to said soaking step; and depositing said seeds in a fresh water solution after removing the same from said first mentioned solution and before centrifuging the seeds to separate by density difference defective seeds and any "black spots" from desired seeds.

4. The method of claim 1, in which said given range on the Baumé density scale is between sixteen and twenty degrees.

References Cited

UNITED STATES PATENTS

| | | | |
|---|---|---|---|
| 679,234 | 7/1901 | Lind et al. | 146—221.9 |
| 1,038,032 | 9/1912 | Urgellés | 146—221.6 |
| 2,340,313 | 2/1944 | Earle | 146—221.9 |
| 2,355,810 | 8/1944 | Loewy | 146—221.9 |
| 2,329,403 | 9/1943 | Logue | 146—221.9 |
| 2,379,184 | 6/1945 | Rakowsky et al. | 146—221.6 |
| 2,379,677 | 7/1945 | Borsakovsky | 146—221.6 X |

JAMES M. MEISTER, Primary Examiner.

U.S. Cl. X.R.

146—221.9, 252